United States Patent Office 2,935,675
Patented May 3, 1960

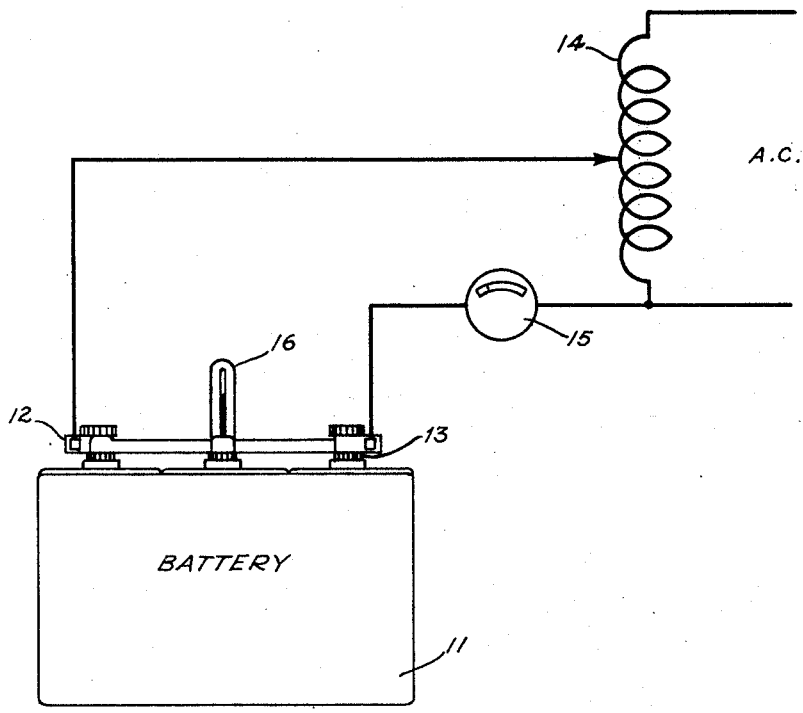

2,935,675
METHOD FOR REACTIVATING STORAGE BATTERIES
Carl Ferguson and William A. Foley, Indianapolis, Ind.
Application October 27, 1958, Serial No. 769,959
2 Claims. (Cl. 320—4)
(Granted under Title 35, U.S. Code (1952), sec. 266)

The invention described herein may be manufactured and used by or for the Government of the United States without the payment of any royalties thereon or therefor.

The present invention relates to a method for reactivating storage batteries and more particularly to a method of reactivating dry charge batteries that have been placed in storage for relatively long periods of time.

Heretofore, battery manufacturers have recommended that batteries which have been in storage should be charged as much as possible, then slowly discharged, and then recharged. This process of charging and discharging is repeated until the battery can be charged to full capacity. This process is time consuming, sometimes taking as long as several days. Also, many batteries fail to charge up to full capacity.

The present invention relates to a novel method for reactivating storage batteries by filling the battery with its recommended regular electrolyte and then connecting alternating current to the battery terminals. The current is regulated so that approximately 10 amperes are passed through the battery for a period of between 30 to 60 minutes. The current is also regulated so that the temperature of the electrolyte does not exceed 100 degrees F. After the alternating current has been applied for a period of 30 to 60 minutes, the battery is immediately placed on charge and can be charged to full capacity in the normal time.

This method of reactivating storage batteries by applying alternating current has been found highly successful in reclaiming batteries that have become sulphated, as well as those that have become oxidized, from being stored in a dry condition for long periods of time. It is therefore an object of the present invention to provide a method for reactivating storage batteries which have sulphated plates.

Another object of the present invention is to provide a novel method of reactivating storage batteries that have become oxidized from being stored in a dry condition for a relatively long period of time.

Still another object of the present invention is to provide a simple, inexpensive method of reactivating storage batteries by applying alternating current to the battery terminals.

Other objects and many of the attendent advantages of this invention will be readily appreciated as the same becomes better understood by reference to the following detailed description when considered in connection with the accompanying drawing which shows the apparatus for performing the process of the invention.

Referring now to the drawing, the numeral 11 indicates a storage battery whose plates have become oxidized from being placed in storage for a long period of time. The regular electrolyte is added to the battery to the desired level and then the battery is completely discharged. The battery terminals 12 and 13 are connected to a 60 cycle alternating current source through a variable voltage transformer 14. Transformer 14 is adjusted so that approximately 10 amperes are passed through the battery for a period of 30 to 60 minutes.

An indicating meter 15 is connected in series with the transformer 14 in order to read the value of the current being applied to the battery terminals. A thermometer 16 is inserted in the electrolyte to determine its temperature while the alternating current is being applied. The temperature of the electrolyte should not exceed 100 degrees F., as too high a temperature will buckle the plates of the battery and cause permanent damage. The temperature can be controlled by regulating the amount of current being applied to the terminals.

After the battery has been treated for a period between 30 to 60 minutes, the alternating current is removed and the battery is immediately charged in the customary manner, well known in the art.

Batteries that have become sulphated can also be reconditioned by a method similar to the heretofore described method of reconditioning batteries that have become oxidized. The battery is first completely discharged. Alternating current is then applied to the battery terminals for a period of approximately one and one-half hours, while maintaining the temperature of the electrolyte below 100 degrees F. After reconditioning with alternating current, the battery is charged in the customary manner.

The above-described method of reactivating batteries has been tried and has proven to be very successful. Approximately seventy-five new batteries had been in storage at the U.S. Naval Avionics Facility, Indianapolis, for a long period of time and could not be fully charged. These batteries were reactivated by the heretofore described method of applying alternating current to the battery terminals. After reactivation, the batteries were capable of taking a full charge and were equal to new, untreated batteries.

Several sulphated batteries were also successfully reactivated by the method herein described. These batteries had been in use for approximately two years and would not charge up to capacity. After reactivation by the method herein described, these batteries that had become sulphated were capable to taking full charge, and have been placed back in use.

It can thus be seen that the method herein described provides an economical way of reactivating batteries that have become oxidized or sulphated and not capable of taking a full charge.

Obviously many modifications and variations of the present invention are possible in the light of the above teachings. It is therefore to be understood that the invention may be practiced otherwise than as specifically described.

What is claimed is:
1. A method of reactivating a new storage battery that has become oxidized comprising, filling said battery with a regular battery electrolyte, discharging said battery, applying alternating current to the terminals of said battery for a period between 30–60 minutes while maintaining the temperature of the battery electrolyte below 100 degrees F., and then charging said battery.

2. A method of reactivating a battery that has become sulphated comprising, filling said battery with a regular battery electrolyte, discharging said battery, applying alternating current to the terminals of said battery for a period of approximately one and one-half hours while maintaining the temperature of the battery electrolyte below 100 degrees F., and then charging said battery.

References Cited in the file of this patent
UNITED STATES PATENTS

| | | |
|---|---|---|
| 1,449,833 | Parker | Mar. 27, 1923 |
| 2,503,179 | Tichenor | Apr. 4, 1950 |
| 2,619,624 | Briggs | Nov. 25, 1954 |
| 2,679,549 | Resek et al. | May 25, 1954 |
| 2,689,322 | Godshalk et al. | Sept. 14, 1954 |